United States Patent Office 3,320,226
Patented May 16, 1967

3,320,226
DYE-RECEPTIVE POLYOLEFIN FIBERS CONTAIN-
ING SATURATED, UNSUBSTITUTED DICARBOX-
YLIC ACID OR ACID ANHYDRIDE
Vittorio Cappuccio, Terni, and Ubaldo Riboni, Turin,
Italy, assignors to Montecatini Edison S.p.A., Milan,
Italy
No Drawing. Filed Apr. 26, 1966, Ser. No. 545,252
2 Claims. (Cl. 260—93.7)

This application is a continuation-in-part of application Serial No. 270,548, filed April 4, 1963, now abandoned, which is in turn a division of application Serial No. 34,385, filed June 7, 1960, now Patent No. 3,112,159.

The present invention relates to polyolefin fibers which are particularly receptive to dyes.

Various processes for obtaining textile fibers from polyolefins, particularly polyolefins consisting prevailingly of isotactic macromolecules, which fibers have a particular receptivity for dyes, have been described. Four typical prior processes may be summarized as follows:

(1) *Preparation of fibers from mixtures.*—Polyolefins are mixed with other resins (e.g., epoxy resins, polyamides, polyimines, polyesters and the like) capable of rendering the fibers dyeable, and the mixtures thus obtained are spun according to the usual spinning techniques. When an epoxy resin is used as a component of the mixture, a subsequent treatment of the resulting fibers with a basic substance is included.

(2) *Grafting of reactive monomers onto the fibers.*— The polyolefin fibers are treated with reactive monomers in the presence of agents which catalyze the polymerization of the monomers. These monomers are thus bound to the fibers by means of graft polymerization. Typical reactive monomers which can be used include vinyl monomers such as acrylonitrile, styrene, vinyl esters, nitrogen-containing monomers such as vinylpyridines, isopropenyl-pyridines, etc., and acid monomers.

(3) *Mixing of polyolefins with various monomers in the spinning stage.*—Polyolefins are mixed with vinyl monomers, acid monomers, or the like before spinning, and the mixes are then subjected to the usual technological operations for preparing textile fibers.

(4) *Chemical treatment of the fibers.*—Polyolefin fibers are subjected to sulfonation and the sulfonated fibers are treated with amines.

We have now found that polyolefin textile fibers having unusual receptivity for dyes, and particularly for acid dyes, can be obtained by mixing the polyolefin with an unsubstituted, saturated dicarboxylic acid or an anhydride thereof. The term "saturated," as used in the present specification and claims is intended to exclude olefinic or acetylenic unsaturation but to include aromatic unsaturation. The dicarboxylic acid may be aliphatic, aromatic or alicyclic, and contains no substituents other than the carboxylic acid functions. This mixture is spun in the usual manner and, in accordance with another aspect of our invention, may be treated with an amino- or imino compound. However, non-aminated fibers are dyeable with either dispersed acetate dyes or basic dyes.

Particularly suitable dicarboxylic acids and/or acid anhydrides include succinic acid, sebacic acid, adipic acid, azelaic acid, glutaric acid, pimelic acid, suberic acid, nonanedicarboxylic acid, decanedicarboxylic acid and phthalic acid (and anhydride).

In addition to the dicarboxylic acid or anhydride, a small amount of a "solid dispersant" can be mixed with the polyolefin, as described in copending application Serial No. 8,529, filed on February 15, 1960, corresponding to Italian Patent No. 608,856. Suitable dispersants include cetyl and stearic alcohols; stearic and terephthalic acids; benzoin; furoin, vinyl stearate; mono-, di-, and tri-stearic esters of glycerol; mono-ethanolamine stearate; stearic acid amide; N-diethanol-lauramide; $C_6$ to $C_{30}$ aliphatic amines; condensation products of ethylene oxide with alcohols, amines and phenols; polyacrylonitrile; polystyrene; styrene copolymers; terpene polymers; etc.

The dicarboxylic acids and anhydrides may be added to the polyolefin in an amount of from about 1 to 25% by weight of the mixture. The solid dispersant should be present in an amount of from about 1.0 to 5% by weight of the mixture.

The amination of the fibers (comprised of the polyolefin-dicarboxylic acid mixture) is preferably carried out by treating the fibers with an anhydrous amine or imine, or with a boiling (generally aqueous) solution of the amine or imine for a time varying from a few seconds to two or three hours, depending on the reactivity of the amine or imine used.

Typical amines and imines which are suitable include ethylene diamine, propylene diamine, hexamethylene diamine, triethylene diamine, diethylene triamine, tetra-ethylene pentamine, ethylene imine, polyethylene imine, 3-diethyl-amino-N-propylamine, tetramethylene diamine, and cyclohexylamine.

The spinning of the polyolefin-dicarboxylic acid composition is carried out more easily than the spinning of the polyolefin alone. The presence of the dicarboxylic acid occasionally makes it possible to carry out the extrusion at lower temperatures.

The following examples will further illustrate our invention; the polyolefins referred to in these examples are preferably those prepared with Natta's catalysts as described, for example, in Italian Patent 526,101 and U.S. Patent No. 3,014,016.

As is known to the art subsequent to the discoveries of Natta et al., and as will be noted from the following examples, the heptane residue indicates the presence of isotactic polypropylene macromolecules. Thus, the crystallinity of the polypropylene of the working examples is due to the presence of isotactic macromolecules.

All parts are by weight unless otherwise stated.

*Example 1*

A mix was prepared in a ball mill from 90 g. of polypropylene and 10 g. of phthalic anhydride. The polypropylene had the following characteristics: [$\eta$] 0.96; residue after heptane extraction 94%; ash content 0.21%.

This mix was spun in a laboratory melt spinning device at 210° C. The fibers were stretched with a ratio of 1:7 at 130° C. Intense solid shades were obtained by dyeing with the followinng dispersed acetate dyes and basic dyes: Setacyl yellow 3G, Cibacet scarlet BR, Aceto-quinone blue RHO, Crystal malachite green, Basic fuchsine, and Astrazon blue.

*Example 2*

After amination of undyed fibers prepared as described in Example 1, this amination being effected by treating the fibers with a boiling 4.5% ethyleneimine solution for 30 minutes, the fiber/bath weight ratio being 1:15, and then washing and drying the treated fibers, solid intense shades were obtained on these fibers with the following four acid dyes: solid yellow 2G, wool red B, alizarine blue ACF, and acid black IVS.

*Example 3*

A mix was prepared in a ball mill from 90 g. of polypropylene and 10 g. of sebacic acid. The polypropylene had the following characteristics: [$\eta$] 0.96; residue after heptane extraction 94%; ash content 0.21%.

This mix was spun in a laboratory melt spinning device at 210° C. The fibers were stretched with a ratio of 1:5 at 130° C. They were then aminated by treatment with a 50% aqueous tetramethylene diamine solution for 2 hours, the fiber/bath weight ratio being 1:10, and then washed and dried. Intense, solid shades were produced on these fibers with the following four acid dyes: solid yellow 2G, wool red B, alizarine blue ACF and acid black IVS.

Variations can, of course, be made without departing from the spirit of our invention.

Having thus described our invention, what we desire to secure and claim by Letters Patent is:

1. A fiber having improved dye receptivity, said fiber having been prepared by intimately mixing polypropylene and a compound selected from the group consisting of saturated, unsubstituted dicarboxylic acids and saturated, unsubstituted dicarboxylic acid anhydrides, and extruding the resulting mixture to form a fiber.

2. The product of claim 1 wherein the resulting fiber has been subjected to a hot amination treatment.

References Cited by the Examiner

UNITED STATES PATENTS

| | | | |
|---|---|---|---|
| 2,142,980 | 1/1939 | Huijser et al. | 260—78.4 |
| 2,733,267 | 1/1956 | Koenecke | 260—78.4 |
| 2,933,468 | 4/1960 | Aldridge et al. | 260—78.4 |
| 2,973,344 | 2/1961 | Fasce | 260—78.4 |

JOSEPH L. SCHOFER, *Primary Examiner.*

LAWRENCE EDELMAN, *Examiner.*